US012181828B2

(12) United States Patent
Liu et al.

(10) Patent No.: US 12,181,828 B2
(45) Date of Patent: Dec. 31, 2024

(54) DEVELOPING CARTRIDGE WITH HOUSING HAVING A DRIVING SIDE AND AN OPPOSITE SIDE, DEVELOPING ROLLER ROTATABLY SUPPORTED BY THE HOUSING, SUPPLY ROLLER ROTATABLY SUPPORTED BY THE HOUSING, DOCTOR BLADE SUPPORTED BY THE HOUSING, DRIVING GEAR ON THE DRIVING SIDE, DETECTED COMPONENT, POWER RECEIVING COMPONENT THAT RECEIVES POWER AND ELECTRICALLY CONNECTED TO THE DOCTOR BLADE

(71) Applicant: JIANGXI YIBO E-TECH CO. LTD., Xinyu (CN)

(72) Inventors: Xiaobing Liu, Xinyu (CN); Haifeng Gu, Xinyu (CN); Shiping Ao, Xinyu (CN); Liangliang Hu, Xinyu (CN); Xiaomin Gong, Xinyu (CN)

(73) Assignee: JIANGXI YIBO E-TECH CO. LTD., Xinyu (CN)

( * ) Notice: Subject to any disclaimer, the term of this patent is extended or adjusted under 35 U.S.C. 154(b) by 0 days.

(21) Appl. No.: 18/094,934

(22) Filed: Jan. 9, 2023

(65) Prior Publication Data

US 2023/0161288 A1 May 25, 2023

Related U.S. Application Data

(63) Continuation of application No. PCT/CN2021/106467, filed on Jul. 15, 2021.

(30) Foreign Application Priority Data

Jul. 15, 2020 (CN) ......................... 202021381604.2
Jul. 20, 2020 (CN) ......................... 202021420422.1
Nov. 30, 2020 (CN) ......................... 202022820758.3

(51) Int. Cl.
*G03G 21/16* (2006.01)
*G03G 21/18* (2006.01)

(52) U.S. Cl.
CPC ..... *G03G 21/1652* (2013.01); *G03G 21/1676* (2013.01); *G03G 21/1814* (2013.01);
(Continued)

(58) Field of Classification Search
None
See application file for complete search history.

(56) References Cited

U.S. PATENT DOCUMENTS 7,643,770 B2 1/2010 Sato et al.
7,693,442 B2 4/2010 Sato et al.
(Continued)

FOREIGN PATENT DOCUMENTS

CN 204989759 U 1/2016
CN 205485286 U 8/2016
(Continued)

OTHER PUBLICATIONS

Machine translation into English of CN207096692.*

*Primary Examiner* — Arlene Heredia
(74) *Attorney, Agent, or Firm* — IPro, PLLC

(57) ABSTRACT

A developing cartridge for detachable mounting in an imaging device having a power supply component has: a housing having a driving side and an opposite side of the driving side in a first direction; a developing roller rotatably supported by the housing, configured to be rotatable about an axis extending in the first direction; a supply roller rotatably supported by the housing and configured to convey a developer to the developing roller; a doctor blade supported by the housing and configured to control a thickness of a developer layer on the developing roller; a driving gear on the driving side and configured to receive driving force from outside the devel-
(Continued)

oping cartridge and rotate; a detected component located on the opposite side; a power receiving component on the opposite side. The power receiving component can touch the power supply component to receive power and is electrically connected to the doctor blade.

8 Claims, 11 Drawing Sheets

(52) U.S. Cl.
CPC ..... *G03G 21/1857* (2013.01); *G03G 21/1867* (2013.01); *G03G 2221/1657* (2013.01); *G03G 2221/166* (2013.01)

(56) References Cited

U.S. PATENT DOCUMENTS

| | | | |
|---|---|---|---|
| 7,693,443 | B2 | 4/2010 | Sato et al. |
| 8,014,694 | B2 | 9/2011 | Sato et al. |
| 8,213,826 | B2 | 7/2012 | Sato et al. |
| 8,693,914 | B2 | 4/2014 | Sato et al. |
| 8,787,786 | B2 | 7/2014 | Sato et al. |
| 8,798,492 | B2 | 8/2014 | Sato et al. |
| 8,873,993 | B2 | 10/2014 | Sato et al. |
| 8,886,076 | B2 | 11/2014 | Sato et al. |
| 9,217,988 | B2 | 12/2015 | Sato et al. |
| 9,513,595 | B2 | 12/2016 | Sato et al. |
| 9,720,347 | B2 | 8/2017 | Sato et al. |

FOREIGN PATENT DOCUMENTS

| | | | |
|---|---|---|---|
| CN | 205485287 | U | 8/2016 |
| CN | 207096692 | U | 3/2018 |
| CN | 208689366 | U | 4/2019 |
| CN | 210666351 | U | 6/2020 |
| CN | 210666358 | U | 6/2020 |
| CN | 210924199 | U | 7/2020 |
| CN | 212623583 | U | 2/2021 |
| IN | 106527075 | A | 3/2017 |

* cited by examiner

DEVELOPING CARTRIDGE WITH HOUSING HAVING A DRIVING SIDE AND AN OPPOSITE SIDE, DEVELOPING ROLLER ROTATABLY SUPPORTED BY THE HOUSING, SUPPLY ROLLER ROTATABLY SUPPORTED BY THE HOUSING, DOCTOR BLADE SUPPORTED BY THE HOUSING, DRIVING GEAR ON THE DRIVING SIDE, DETECTED COMPONENT, POWER RECEIVING COMPONENT THAT RECEIVES POWER AND ELECTRICALLY CONNECTED TO THE DOCTOR BLADE

TECHNICAL FIELD

The present invention relates to a developing cartridge detachably mounted in an image forming device, and in particular to an electrode in the developing cartridge.

BACKGROUND

An image forming device for electrophotographically printing an image, in which a process cartridge is detachably mounted, has been proposed in the prior art. The process cartridge includes a developing cartridge and a photosensitive cartridge. The developing cartridge has a developing roller. The developing cartridge is detachably mounted to the photosensitive cartridge, and the photosensitive cartridge has a photosensitive drum.

This developing cartridge includes: a developing roller that carries a developer; a supply roller that supplies the developer to the developing roller; and an electrode component that is electrically connected to rotating shafts of the developing roller and the supply roller.

In the existing developing cartridges, the electrode component is usually integrated at one side end of the developing cartridge in a length direction, so as to realize the electrical connection between the image forming device and the developing roller.

SUMMARY

A main objective of the present invention is to provide a developing cartridge, wherein the electrode of the developing cartridge is not necessarily limited to be integrated and designed on one side of the developing cartridge in the length direction, thereby increasing the design freedom of the electrode. The present invention is achieved through the following technical solutions.

Disclosed herein is a developing cartridge, configured to be detachably mounted in an image forming device, comprising: a housing; a developing roller rotatably supported by the housing, the developing roller configured to rotate about an axis extending in a first direction, the developing roller having a developing roller shaft; a supply roller rotatably supported by the housing and configured to convey developer to the developing roller, the supply roller having a supply roller shaft; a driving gear disposed on a driving side of the housing; and an electrode electrically connected to the developing roller shaft and the supply roller shaft, the electrode comprising a first part, a second part, and an intermediate electrical connection part connecting the first part and the second part; wherein the first part is located on an opposite side of the driving side of the housing, the second part is located on the driving side of the housing, and wherein the opposite side of the driving side and the driving side are opposite ends of the housing in the first direction;

and the second part is in contact with the supply roller shaft and the developing roller shaft or the supply roller shaft is electrically connected to the developing roller shaft by the second part.

In an aspect, the first part is not in contact with the developing roller shaft on the opposite side of the driving side of the housing, and the second part is in contact with the developing roller shaft on the driving side of the housing.

In an aspect, the supply roller shaft is configured as the intermediate electrical connection part of the electrode, and in the first direction, one end of the supply roller shaft is in contact with the first part, and the other end of the supply roller shaft is in contact with the second part.

In an aspect, the intermediate electrical connection part extends along the first direction from the driving side of the housing to the opposite side of the driving side of the housing, and the intermediate electrical connection part is configured as one conductive metal component.

In an aspect, the developing cartridge further comprises a cover on the opposite side of the driving side of the housing, the cover having an opening, wherein at least a portion of the first part is exposed outside the housing through the opening.

In an aspect, the opening is configured to limit movement of the first part relative to the housing by contact with the first part.

In an aspect, the developing roller is disposed on a front end side in a front-rear direction perpendicular to the first direction, and further comprises an agitator disposed on a rear end side of the developing cartridge in the front-rear direction, and the intermediate electrical connection part is disposed between the developing roller and the agitator.

In an aspect, the developing cartridge further comprises a bearing component disposed on the driving side to support the developing roller shaft, wherein in the first direction, at least a part of the intermediate electrical connection part passes through the bearing component.

In an aspect, the developing cartridge further comprises a detected component to be detected by the image forming device, wherein the first part and the detected component are both located on the opposite side of the driving side of the housing.

In an aspect, a developing roller bearing portion is configured to support the developing roller shaft is provided on the second part.

In an aspect, a supply roller bearing portion is configured to support the supply roller shaft is provided on the second part.

In an aspect, a developing roller bearing portion is configured to support the developing roller shaft and a supply roller bearing portion is configured to support the supply roller shaft are provided on the second part.

In an aspect, the developing cartridge further comprises a chip located on the driving side of the housing and a chip holder configured to support the chip, wherein the chip holder is made of insulating material.

In an aspect, the chip has an exposed electrical contact surface, and the exposed electrical contact surface is spaced apart from the developing roller and the supply roller in the first direction.

In an aspect, the first part is not contact with the developing roller shaft.

Also disclosed herein is a developing cartridge, configured to be detachably mounted in an image forming device, comprising: a housing; a developing roller rotatably supported by the housing, the developing roller configured to rotate about an axis extending in a first direction, the developing roller having a developing roller shaft; a supply roller rotatably supported by the housing and configured to convey developer to the developing roller, the supply roller having a supply roller shaft; a driving gear disposed on a driving side of the housing; and an electrode electrically connected to the developing roller shaft and the supply roller shaft, the electrode comprising a first part, a second part, and an intermediate electrical connection part connecting the first part and the second part; wherein the first part is located on an opposite side of the driving side of the housing, the second part is located on the driving side of the housing, and the opposite side of the driving side and the driving side are opposite ends of the housing in the first direction; wherein the supply roller shaft is electrically connected to the developing roller shaft by the second part.

DETAILED DESCRIPTION

The embodiments of the present invention will be described in detail below in conjunction with the drawings. It should be understood that specific embodiments described herein are only used to explain the present invention and are not used to limit the present invention.

Embodiment 1

Figure 1:
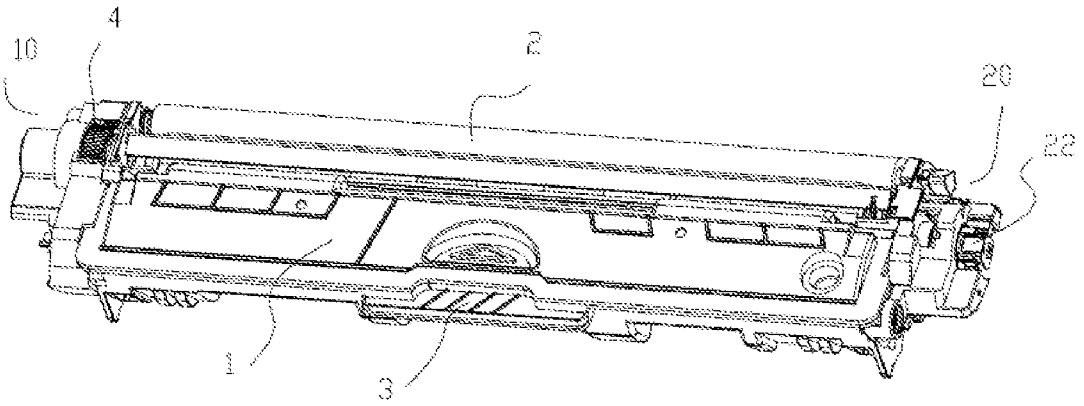
FIG. 1 is a schematic view of a three-dimensional structure of a developing cartridge in Embodiment 1 of the present invention.
Figure 2:
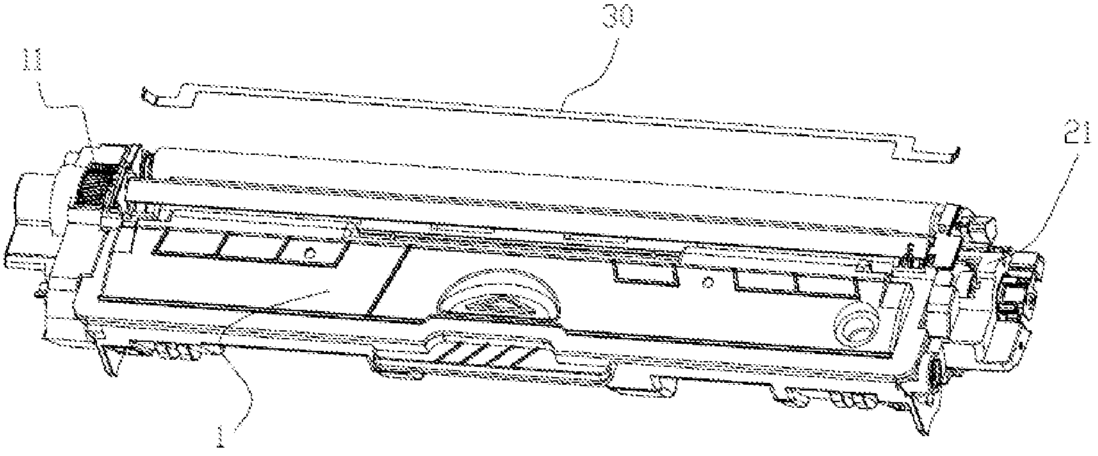
FIG. 2 is a schematic view of a partial exploded structure of an electrode in the developing cartridge in Embodiment 1 of the present invention.
Figure 3:
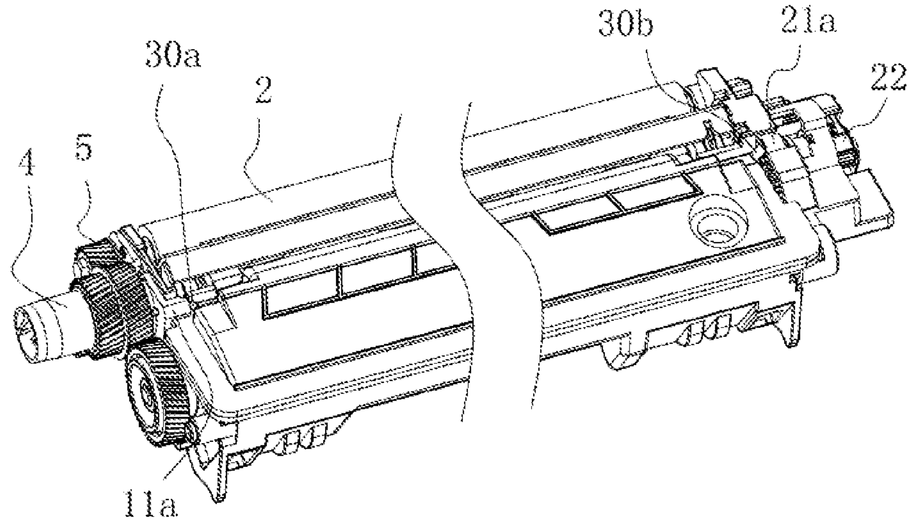
FIG. 3 is a schematic structural view of electrical contact positions of components of the electrode in the developing cartridge in Embodiment 1 of the present invention.
Figure 4:
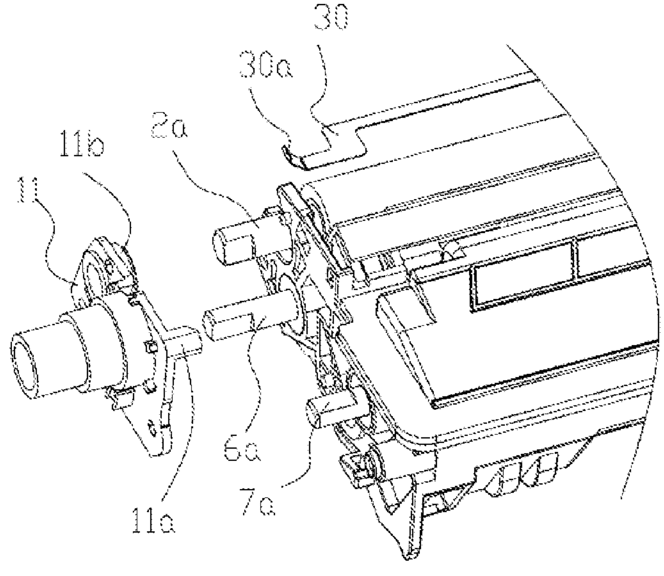
FIG. 4 is a schematic view of a partial exploded structure of a driving side of the developing cartridge in Embodiment 1 of the present invention.
Figure 5:
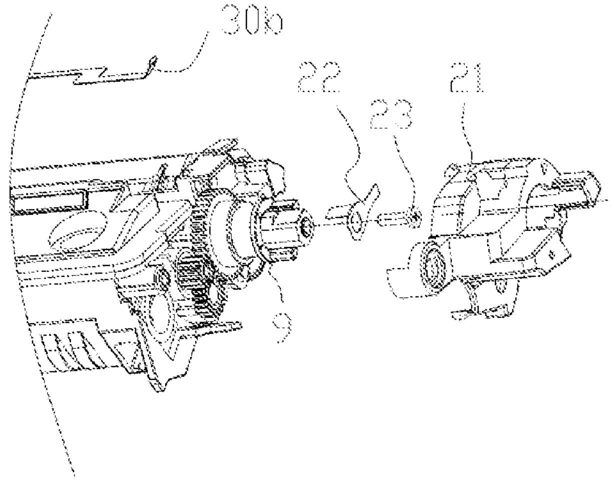
FIG. 5 is a schematic view of a partial exploded structure of an opposite side of the driving side of the developing cartridge in Embodiment 1 of the present invention.

First, as shown in FIGS. 1 and 2, a developing cartridge of the present invention is detachably mounted in an image forming device. The developing cartridge includes a housing 1, a developing roller 2, a handle 3, a driving gear 4 and an electrical contact component 22. The housing 1 has a developer accommodating chamber in which a developer can be accommodated. The developing roller 2 is rotatably supported by the housing 1, and can rotate about a rotation axis extending in a first direction, which is a length direction of the housing 1. The developing roller 2 and the handle 3 are disposed opposite to each other in a front-rear direction of the housing 1, the developing roller 2 is disposed on a front end side of the housing 1, and the handle 3 is disposed on a rear end side of the housing 1, wherein the front-rear direction is perpendicular to the length direction. The driving gear 4 and the electrical contact component 22 are disposed opposite to each other in the length direction of the housing 1. In the length direction, a side where the driving gear 4 of the housing 1 is located is referred to as a driving side 10, and a side where the electrical contact component 22 is located is referred to as an opposite side 20 of the driving side. When the developing cartridge is mounted in the image forming device and is in a process of image formation, the developing roller 2 in the developing cartridge needs to be powered from the image forming device. An electrode is provided on the developing cartridge, and the electrode is used to electrically connect a power supply component (not shown in the figures) in the image forming device and the developing roller 2 to supply power to the developing roller 2. Specifically, the electrode includes a first contact portion that is in contact with the above power supply component in the image forming device, a second contact portion that is in contact with a developing roller shaft of the above developing roller, and an intermediate electrical connection portion connecting the first contact portion and the second contact portion, and the intermediate electrical connection portion electrically connects the first contact portion and the second contact portion.

As shown in FIGS. 2 to 5, the electrodes of the developing cartridge in this embodiment include an electrical contact component 22, a first electrical connection component 21, a second electrical connection component 30 and a third electrical connection component 11. A detected component 9 is provided on the opposite side 20 of the driving side of the developing cartridge. The detected component 9 is used to provide the image forming device with information such as whether the developing cartridge is a new cartridge, and can be detected by the image forming device. The detected component 9 moves and toggles a detection body (not shown in the figures) in the image forming device to provide the image forming device with the information such as whether the developing cartridge is a new cartridge. In order to simplify the structure of the developing cartridge and save space, the detected component 9 and the first electrical contact portion are simultaneously disposed on the opposite side 20 of the driving side of the housing 1 of the developing cartridge, and the driving gear 4 and the second electrical contact portion are simultaneously disposed on the driving side 10 of the housing 1, so that the layout of the driving side 10 and the opposite side 20 of the driving side of the housing 1 of the developing cartridge can be more symmetrical and reasonable, the space utilization rate of the developing cartridge can be higher, the structure of the developing cartridge can be made more compact, and the size of the developing cartridge can be miniaturized as much as possible. Preferably, the detected component 9 touches the detection body in the image forming device by means of rotational motion. Meanwhile, in order to save the space of the developing cartridge and the image forming device, the detection body and the power supply component in the image forming device are integrated at one position. Therefore, the detected component 9 and the electrical contact component 22 in the developing cartridge are also disposed at adjacent positions. In this embodiment, the electrical contact component 22 is in contact with the power supply component in the image forming device, the first contact portion of the electrode is disposed on the electrical contact component 22, and the electrical contact component 22 is fixed at a position overlapping with the detected component 9 when viewed along the length direction of the housing 1 by a screw 23, so that the structure of the developing cartridge can be more compact to save space. In other words, the electrical contact portion 22 overlaps with at least a part of the detected component 9 when viewed along the rotational axis direction of the developing roller 2. The first electrical connection component 21 and the electrical contact component 22 are divided into two components, so that the electrical contact component 22 can be made of metal material to be thinner and smaller, and the wear resistance of the electrical contact component 22 can also be improved at the same time. However, the present invention is not limited to this. A simple modification may also be that the first electrical connection component 21 and the electrical contact component 22 are integrally formed, as long as a corresponding avoidance opening is disposed on the electrical connection component 21 at a position where the detected component 9 is in contact with the detection body in the image forming device during the rotation process at this time.

The driving side 10 of the developing cartridge includes a third electrical connection component 11, a developing roller shaft end portion 2*a*, a supply roller shaft end portion 6*a*, and an agitator shaft end portion 7*a*. The supply roller (not shown in the figures) is used to supply the developer to the developing roller 2, and an agitator is used to stir and convey the developer located in the developer accommodating chamber in the housing 1. Both the developing roller shaft and the supply roller shaft are made of metal material. The developing roller shaft end portion 2*a* and the supply roller shaft end portion 6*a* protrude from a side wall of the developer accommodating chamber of the housing 1. The second electrical connection component 30 electrically connects the first electrical connection component 21 and the third electrical connection component 11. It is configured to span the length direction of the housing 1, and has a driving side electrical contact end 30*a* and a driving side opposite side electrical contact end 30*b*. The driving side electrical contact end 30*a* is in electrical contact with the third electrical connection component 11, and the driving side opposite side electrical contact end 30*b* is in electrical contact with the first electrical connection component 21. The first electrical connection component 21 includes a first electrical contact portion 21*a* that is in electrical contact with the driving side opposite side electrical contact end 30*b*, and the third electrical connection component 11 includes a third electrical contact portion 11*a* that is in electrical contact with the driving side electrical contact end 30*a*. The first electrical contact portion 21*a* is in electrical contact with the driving side opposite side electrical contact end 30*b* at a position on the opposite side 20 of the driving side of the developing cartridge, and the third electrical contact portion 11*a* is in electrical contact with the driving side electrical contact end 30*a* at the driving side 10 of the developing cartridge. Preferably, the first electrical connection component 21 also serves as a cover component covering the detected component 9, and the third electrical connection component 11 also serves as a bearing component for supporting the developing roller shaft end portion 2*a*. Further, the third electrical connection component 11 may also serve as a bearing component for supporting the supply roller shaft end portion 6*a*. Specifically, the third electrical connection component 11 includes a developing roller bearing portion 11*b*, which is configured as a circular through hole for supporting the developing roller shaft end portion 2*a*, and the third electrical connection component 11 also electrically contacts the developing roller shaft end portion 2*a* through the developing roller bearing portion 11*b*. Therefore, in this embodiment, the second contact portion of the electrode is disposed on the third electrical connection component 11, and the intermediate electrical connection component includes a first electrical connection component 21, a second electrical connection component 30, a third electrical connection component 11, and a part of the electrical contact component 22 that is connected to the first contact portion. Further, the third electrical connection component 11 may also include a supply roller bearing portion for supporting the supply roller shaft while supplying power to the supply roller to improve the image forming quality. Preferably, both the first electrical connection component 21 and the third electrical connection component 11 are made of conductive resin material. The third electrical connection component 11 serving as a bearing component for supporting the developing roller shaft end portion 2*a*, may be made of POM conductive resin material with self-lubricating effect. However, it is not limited to this, and may also be made of other conductive materials with rigid structures such as conductive metal. The second electrical connection component 30 is preferably made of metal material, but it is not limited to this.

Embodiment 2

Figure 6:
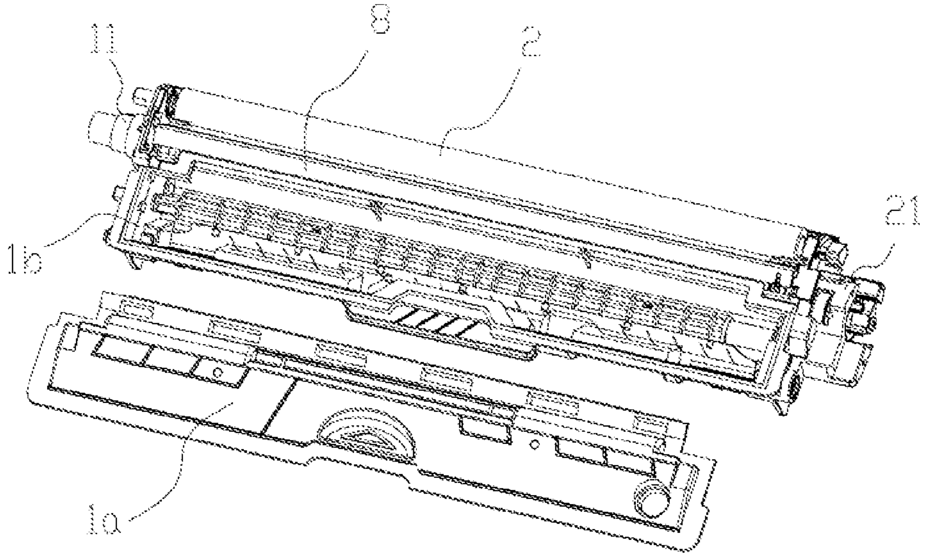
FIG. 6 is a schematic view of a partial exploded structure of an developing cartridge in Embodiments 2, 3 and 4 of the present invention.

As shown in FIG. 6, Embodiment 2 of the present invention is different from Embodiment 1 in that the structure of the intermediate electrical connection component of the electrode is different. In this embodiment, the second electrical connection component is a doctor blade 8 extending in the length direction of the housing 1. Specifically, the doctor blade 8 in the developing cartridge for limiting the thickness of the developer layer on the surface of the developing roller 2 is made of metal material. Both sides of the doctor blade 8 in the length direction are in electrical contact with the first electrical connection component 21 and the third electrical connection component 11, respectively. Through this structure, the doctor blade 8 in the developing cartridge can be further utilized. The doctor blade 8 is also the second electrical connection component, which further saves the space of the developing cartridge, can also omit one second electrical connection component in Embodiment 1, and can further reduce the manufacturing cost of the developing cartridge.

Embodiment 3

As shown in FIG. 6, Embodiment 3 of the present invention is different from Embodiment 1 in that the structure of the intermediate electrical connection component of the electrode is different. The developer accommodating chamber of the housing 1 of the developing cartridge includes an upper cover 1*a* and a bottom cover 1*b*. After the upper cover 1*a* and the bottom cover 1*b* are welded by an ultrasonic welding process, a developer accommodating space is formed therein. In this embodiment, the second electrical connection component is the upper cover 1*a*, and the upper cover 1*a* may be made of conductive resin material. After the upper cover 1*a* is used as the second electrical connection component, this embodiment can be simply modified. In this embodiment, the first electrical connection component, the third electrical connection component and the electrical contact component in Embodiment 1 can be eliminated. The structure of the upper cover 1*a* is simply modified so that the upper cover 1*a* can be electrically connected to the developing roller shaft from the power supply component of the image forming device alone. That is, the upper cover 1*a* has both a cover first electrical contact portion that is in electrical contact with the power supply component of the image forming device and a cover second electrical contact portion that is in electrical contact with the developing roller shaft.

Embodiment 4

As shown in FIG. 6, Embodiment 4 of the present invention is different from Embodiment 3 in that in Embodiment 3, the upper cover 1*a* is used as the intermediate electrical contact component to realize the intermediate electrical connection portion between the power supply component of the image forming device and the developing roller shaft, and in this embodiment, the lower cover 1*b* is used to realize this function. In this embodiment, the lower cover 1*b* is made of conductive resin material.

Embodiment 5

Figure 7:
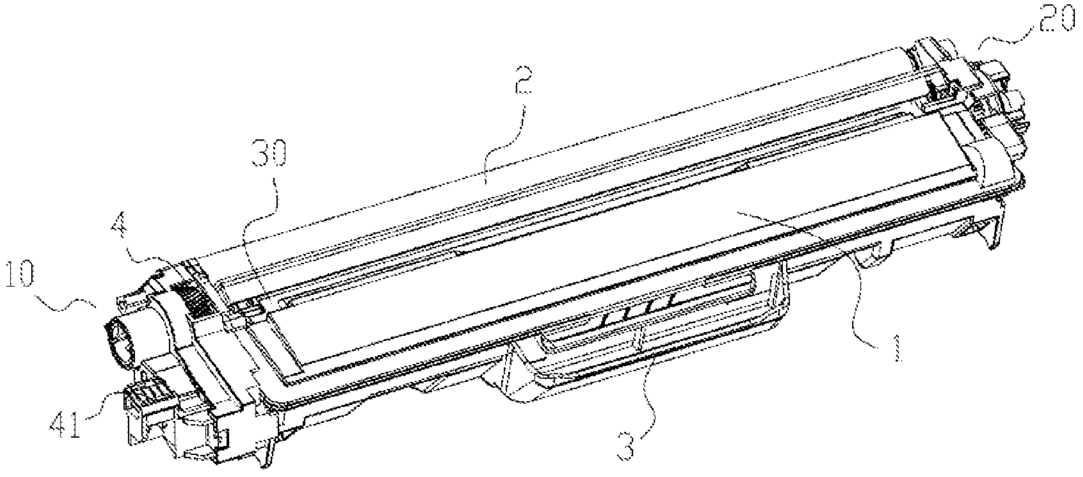
FIG. 7 is a schematic view of a three-dimensional structure of a developing cartridge in Embodiment 5 of the present invention.
Figure 8:
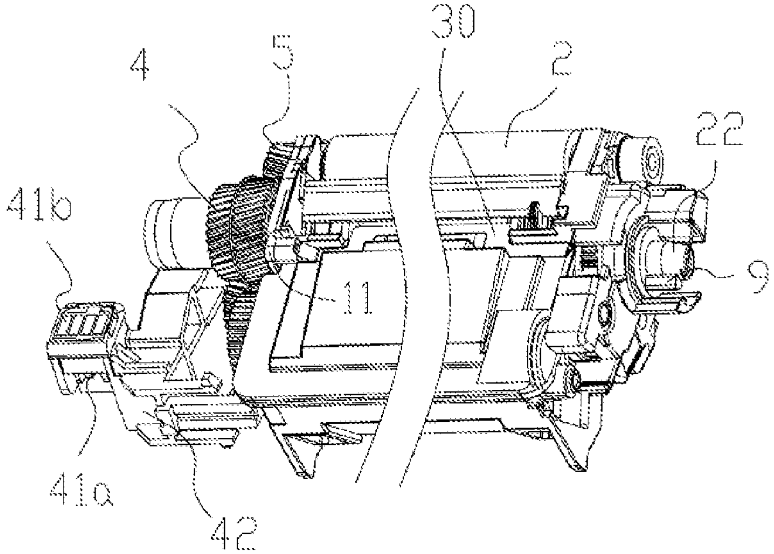
FIG. 8 is a schematic structural view after removing a driving side cover in Embodiment 5 of the present invention.

Embodiment 5 of the present invention will be described below. As shown in FIGS. 7 and 8, in Embodiment 5 of the present invention, an integrated circuit chip 41 is also provided on the developing cartridge. The integrated circuit chip 41 stores information such as a page yield of the developing cartridge. The integrated circuit chip 41 may also cooperate with the detected component 9 to simultaneously provide the image forming device with information such as whether the developing cartridge is a new cartridge and the page yield of the developing cartridge. The integrated circuit chip 41 includes a body storage portion 41*a* and an electrical contact surface 41*b*. The electrical contact surface 41*b* is electrically connected to the body storage portion 41*a*, and the electrical contact surface 41*b* is used for coming into contact with electrical contacts in the image forming device. The image formation device can read/write information from/to the integrated circuit chip 41. The integrated circuit chip 41 needs to be arranged on the developing cartridge. It is considered that the electrical contact component 22 and the detected component 9 are disposed on the opposite side 20 of the driving side of the developing cartridge, and only a gear train transmitting driving force is disposed on the driving side 10 of the developing cartridge Therefore, the integrated circuit chip 41 is disposed on the driving side 10 of the developing cartridge, and the structural arrangement of the driving side 10 and the opposite side 20 of the driving side of the developing cartridge is more symmetrical and reasonable, facilitating the miniaturized design of the structure of the developing cartridge. Meanwhile, the electrode structure design of the developing cartridge may adopt the same design as in Embodiment 1 to 4 described above, which all adopt the structure spanning both sides of the housing 1 in the length direction. The structure of various electrodes is not elaborated again in this embodiment. The integrated circuit chip 41 is mounted on the developing cartridge by means of a chip holder 42. The chip holder 42 is made of insulating material, and can isolate a part of the electrode on the driving side 10 of the developing cartridge from electrical interference to the integrated circuit chip 41. Specifically, for example, the interference to the integrated circuit chip 41 caused by the third electrical connection component 11 in the electrode in Embodiment 1 is used. Preferably, the chip holder 42 further includes at least a part located between the electrical contact surface 41*b* of the chip integrated circuit chip 41 and the third electrical connection component 11 in the length direction of the developing cartridge, which can well insulate the integrated circuit chip 41 and the electrode.

Embodiment 6

Figure 9:
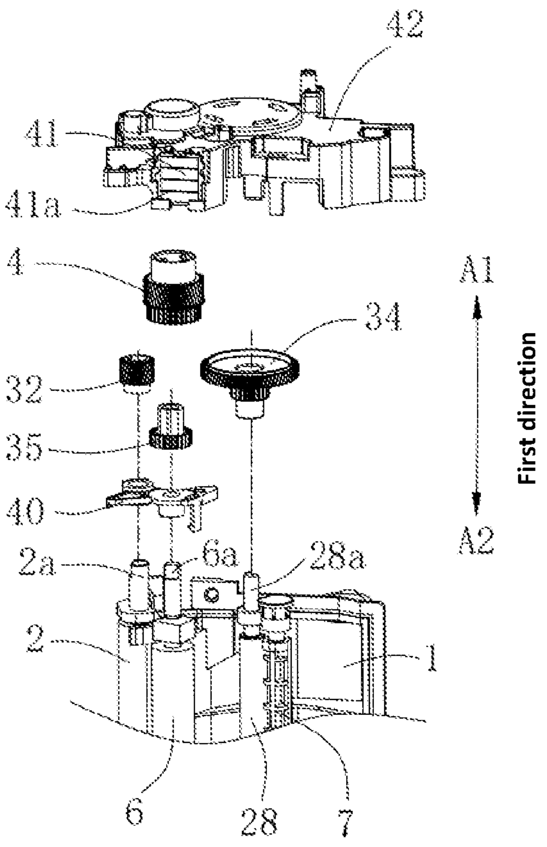
FIG. 9 is a partial exploded schematic view of a first end of an developing cartridge in Embodiment 6 of the present invention.
Figure 10:
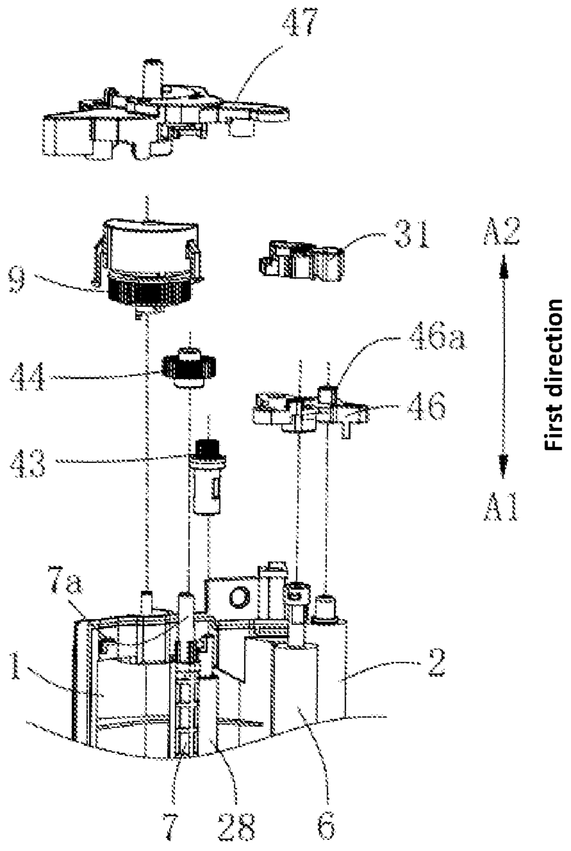
FIG. 10 is a partial exploded schematic view of a second end of the developing cartridge in Embodiment 6 of the present invention.
Figure 11:
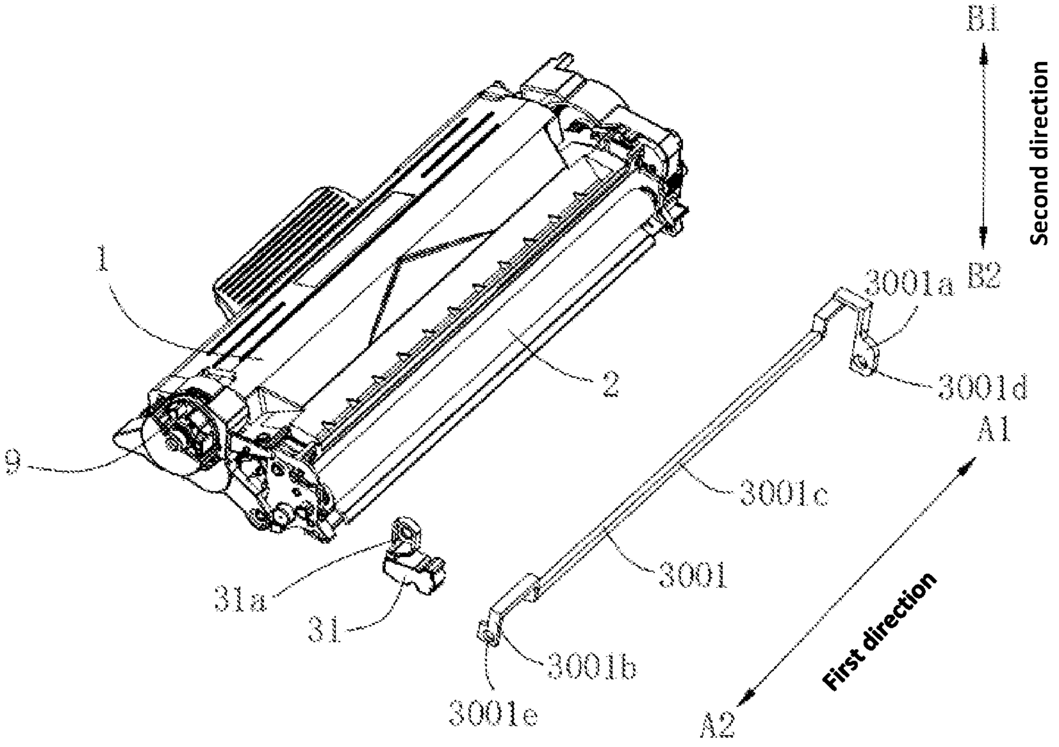
FIG. 11 is an exploded schematic view of an electrode and an electrical contact component in the developing cartridge in Embodiment 6 of the present invention.
Figure 12:
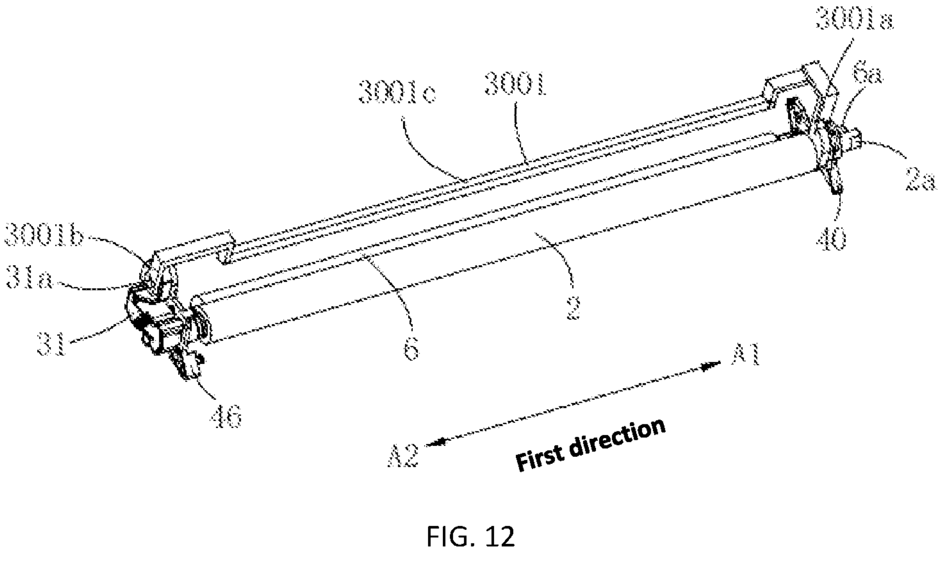
FIG. 12 is a partial assembled schematic view of the electrode in the developing cartridge in Embodiment 6 of the present invention.
Figure 13:
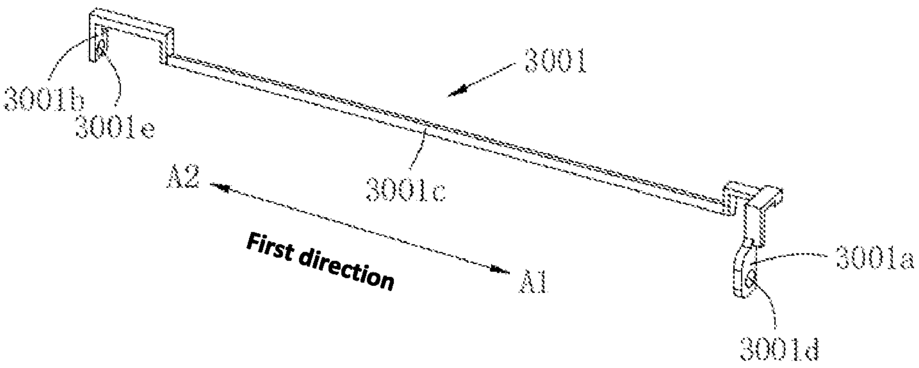
FIG. 13 is a schematic view of the electrode in the developing cartridge in Embodiment 6 of the present invention.

Embodiment 6 of the present invention will be described below. As shown in FIGS. 9 to 11, the developing cartridge has two end portions on both sides in the first direction, i.e., a first end portion A1 and a second end portion A2. The first end portion A1 is provided with a first gear cover 42, a driving gear 4, a developing roller gear 32, a supply roller gear 35, a first transmission gear 34, and a third electrical connection component 11, and the second end portion A2 is provided with a second gear cover 47, a second transmission gear 43, an agitator gear 44, a detected component 9 and a second bearing member 46.

The first gear cover 42 is disposed on an outer surface of the first end portion A1 of the developing cartridge, and is covered and mounted on the driving gear 4, the developing roller gear 32, the supply roller gear 35, and the first transmission gear 34. The second gear cover 47 is disposed on an outer surface of the second end portion A2 of the developing cartridge, and is covered and mounted on the second transmission gear 43 and the agitator gear 44.

The developing roller gear 32 is mounted on a developing roller shaft end portion 2*a* of the first end portion A1 of the developing roller 2. The driving gear 4 is meshed with the developing roller gear 21 to drive the developing roller 2 to rotate together.

The supply roller gear 35 is mounted on a supply roller shaft end portion 6*a* of the first end portion A1 of the supply roller 6 in the first direction. The driving gear 4 is meshed with the supply roller gear 35 to drive the supply roller 6 to rotate together.

The first transmission gear 34 is mounted on a transmission rod shaft end portion 28*a* of a first end portion A1 of a transmission rod 28 in the first direction. The driving gear 4 is meshed with the first transmission gear 34 to drive the transmission rod 28 to rotate together. The second transmission gear 43 is mounted on a second end portion A2 of the transmission rod 28 in the first direction, and can be driven by the transmission rod 28 to rotate.

The agitator gear 44 is mounted on an agitator shaft end portion 7*a* of a second end portion A2 of the agitator 7 in the first direction. The agitator gear 44 is meshed with the second transmission gear 43 at the second end portion A2 to drive the agitator gear 44 to rotate.

A first bearing member 40 and the second bearing member 46 support the developing roller shaft and the supply roller shaft at the first end portion A1 and the second end portion A2 in the first direction, respectively. Further, the first bearing member 40 is made of conductive material, and the second bearing member 46 is made of insulating material. Among them, the second bearing member 46 has a protrusion 46*a* configured as a cavity, and the developing roller shaft of the second end portion A2 is mounted in the cavity of the protrusion 46*a* to separate the developing roller shaft from a power receiving component 31 at the second end portion A2.

The developing cartridge further includes the power receiving component 31, which is disposed on a second bearing bracket 46 of the second end portion A2. The power receiving component 31 is made of conductive material, such as conductive resin, metal, etc. One end of the power receiving component 31 may be in electrical contact with a power supply component (not shown) in the image forming device, and an abutting portion 31*a* at the other end of the power receiving component 31 abuts against an electrode 3001 (described in detail later) in the developing cartridge.

The integrated circuit chip 41 has an electrical contact surface 41*a* that may be in electrical contact with the power supply component in the image forming device. The electrical contact surface 41*a* is disposed at the first end portion A1 on the same side as the driving gear 4 in the first direction, and the power receiving component 31 is disposed at the second end portion A2 on the same side as the detected component 9. That is, the electrical contact surface 41*a* and the power receiving component 31 are disposed on different sides of the developing cartridge in the first direction, and in a second direction perpendicular to the first direction, the developing cartridge has two end portions in the second direction, i.e., a third end portion B1 and a fourth end portion B2. The electrode 3001 is disposed on the third end portion B1 of the developing cartridge in the second direction, and the integrated circuit chip 41 is disposed on the fourth end portion B2 of the developing cartridge in the second direction. That is, the electrode 3001 and the integrated circuit chip 41 are also located on different sides of the developing cartridge in the second direction. Such a design can suppress failures caused by the power received by the power receiving component 31 or the electrode 3001 being transmitted to the integrated circuit chip 41, and can also avoid the problem that the mutual electrical interference affects the image forming quality.

As shown in FIGS. 9-13, when the developing cartridge is mounted in the image forming device and is in a process of image formation, the developing roller 2 and the supply roller 6 in the developing cartridge need to be powered from the image forming device. Therefore, the developing cartridge is also provided with an electrical connection component 3001, which is configured to span the length direction (i.e., the first direction) of the developing cartridge. The electrical connection component 3001 includes a first electrical connection component 3001*b* abutting against the power receiving component 31, a third electrical connection component 3001*a* that is in contact with the developing roller 2, and a second electrical connection component 3001*c* connecting the first electrical connection component 3001*b* and the third electrical connection component 3001*a*. The second electrical connection component 3001*c* electrically connects the first electrical connection component 3001*b* and the third electrical connection component 3001*a*.

Specifically, the first electrical connection component 3001*b* is disposed at the second end portion A2 of the electrical connection portion 3001, and the first electrical connection component 3001*b* may abut against an abutting portion 31*a* of the power receiving component 31 also disposed at the second end portion A2 of the developing cartridge to receive power transmitted from the power supply component in the image forming device. The third electrical connection component 3001*a* is disposed at the first end portion A1 of the electrical connection portion 3001, and the third electrical connection component 3001*a* may abut against the developing roller shaft end portion 2*a*. The second electrical connection component 3001*c* electrically connects the first electrical connection component 3001*b* and the third electrical connection component 3001*a*, so as to transmit power from the first electrical connection component 3001*b* of the electrical connection portion 3001 to the third electrical connection component 3001*a*, thereby realizing the electric connection between the image forming device and the developing roller 2. Then, it is further electrically connected to the supply roller shaft end portion 6*a* mounted on the first bearing member 40 like the developing roller shaft end portion 2*a*, thereby realizing the electrical connection with the supply roller 6. Further, a first mounting hole 3001*e* and a second mounting hole 3001*d* are provided on the first electrical connection component 3001*b* and the third electrical connection component 3001*a*, respectively, wherein the first mounting hole 3001*e* may be fixed to the electrical receiving component 31 also having a mounting hole by a screw, and the developing roller shaft end portion 2*a* may be mounted in the second mounting hole 3001*d* to be in contact with the electrical connection portion 3001. Further, the electrode 3001 is made of conductive resin, but the present invention is not limited to this. It may also be made of metal material. Further, the electrical connection portion 3001 is integrally formed, but the present invention is also not limited to this. The electrical connection portion 3001 may also be formed separately. That is, the first electrical connection component 3001*b*, the second electrical connection component 3001*c*, and the third electrical connection component 3001*a* are formed separately, and may be connected and fixed by means of screws, gluing, or the like.

Embodiment 7

Figure 14:
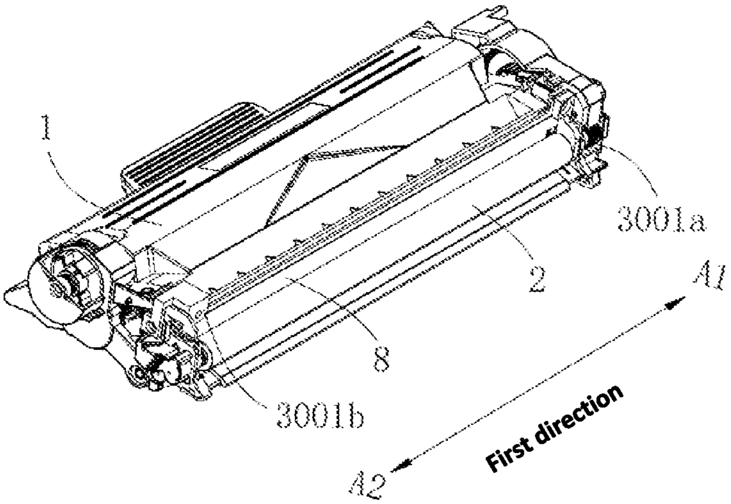
FIG. 14 is a schematic view of a developing cartridge in Embodiment 7 of the present invention.

As shown in FIG. 14, the structure of the developing cartridge in Embodiment 7 is substantially the same as that in Embodiment 6, and will not be repeated here. Their difference is that the structure of the second electrical connection component of the electrode is different. In this embodiment, the second electrical connection component is configured as a doctor blade 8 extending in the first direction, the doctor blade 8 is made of metal material, and both ends of the doctor blade 8 in the first direction abut against the first electrical connection component 3001*b* and the third electrical connection component 3001*a*, respectively. Through this structure, the doctor blade 8 in the developing cartridge can be further utilized. The doctor blade 8 can not only control the thickness of the developer layer, but also serve as the second electrical connection component, which saves the space of the developing cartridge and facilitates the miniaturization of the developing cartridge while reducing the production cost of the developing cartridge.

Embodiment 8

Figure 15:
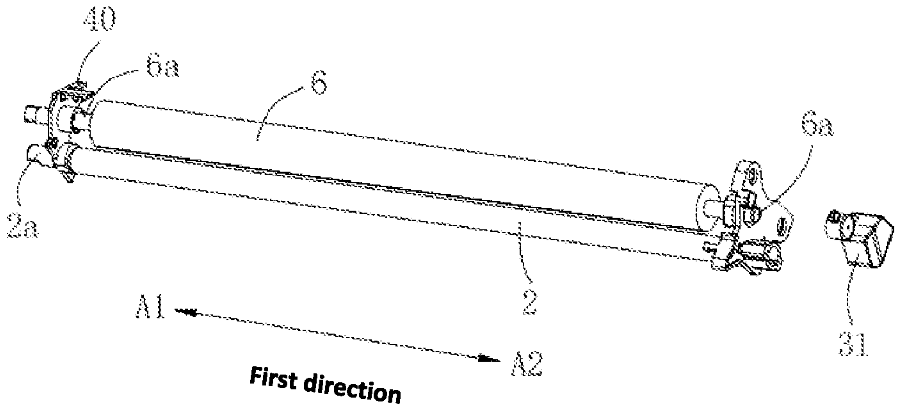
FIG. 15 is a partial exploded schematic view of a developing cartridge in Embodiment 8 of the present invention.
Figure 16:
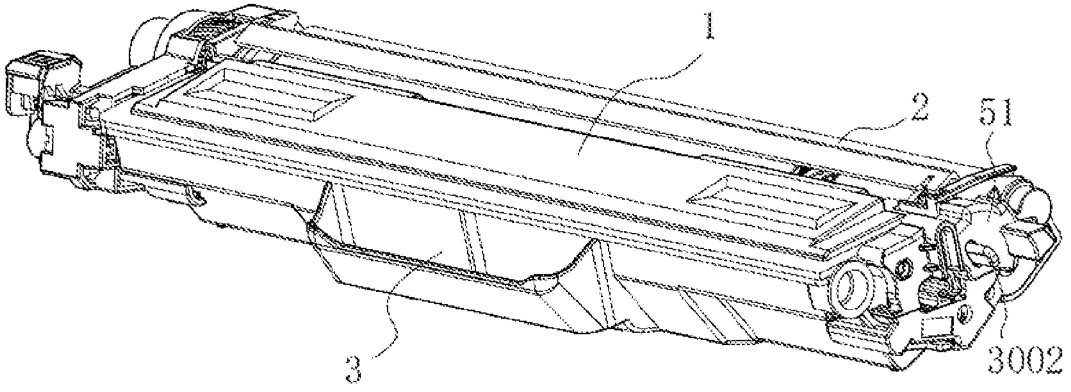
FIG. 16 is a schematic view of a three-dimensional structure of a developing cartridge in Embodiment 9 of the present invention.
Figure 17:
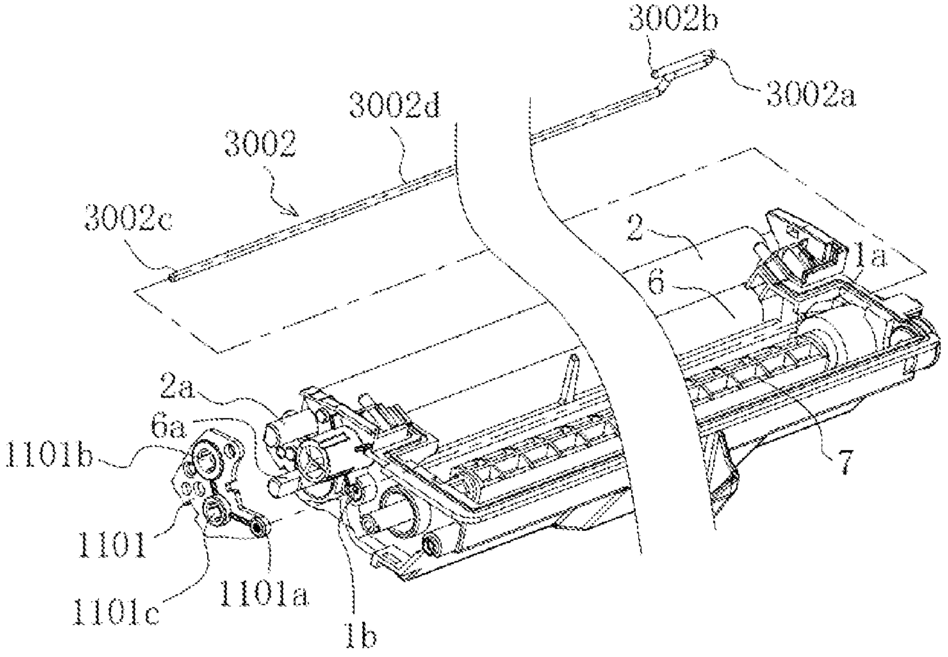
FIG. 17 is a schematic view of a partial exploded structure of the developing cartridge in Embodiment 9 of the present invention.

As shown in FIG. 15, the structure of the developing cartridge in Embodiment 8 is substantially the same as those in Embodiment 6, and will not be repeated here. Their difference is that the structure of the second electrical connection component is different. The power receiving component 31 in this embodiment may abut against the supply roller shaft end portion 6*a* located at the second end portion A2 to receive the power transmitted from the power supply component in the image forming device. The power may be transmitted from the supply roller shaft end portion 6*a* of the second end portion A2 to the supply roller shaft end portion 6*a* of the first end portion A1 through the supply roller shaft. The supply roller shaft end portion 6*a* of the first end portion A1 is mounted on the first bearing member 40, and the power may be transmitted from the supply roller shaft end portion 6*a* of the first end portion A1 to the developing roller shaft end portion 2*a* located at the first end portion A1 and also mounted thereon through the conductive first bearing member 40. Therefore, the above structure can also achieve the technical effect that the developing roller 2 and the supply roller 6 are electrically connected to the image forming device.

In order to make the electrical contact surface 41*b* of the integrated circuit chip 41 as far away as possible from other energized components in the developing cartridge to reduce the interference of signal transmission of the integrated circuit chip 41 by other charged components, the electrical contact surface 41*b* is disposed as far away as possible from the charged components inside the process cartridge in the extension direction of the axis of the developing roller. Specifically, in the extension direction of the axis of the developing roller, the electrical contact surface 41*b* is disposed to have an interval with the charged components inside the developing cartridge. The charged components refer to the developing roller, the supply roller, the doctor blade, the electrical transmission component and the like inside the developing cartridge.

Embodiment 9

Embodiment 9 of the present invention will be described. As shown in FIGS. 16 to 19, the specific structure of the electrical connection component in this embodiment is different from the previous embodiments. In this embodiment, the electrical connection component 3002 passes through the interior of the developer accommodating chamber 54 and is supported by the housing 1. Specifically, the housing 1 is provided with a first hole 1*a* on the driving side and a second hole 1*b* on the opposite side of the driving side. The electrical connection component 3002 includes an electrical contact portion 3002*a*, an auxiliary fixing portion 3002*b*, an electrical transmission portion 3002*c*, and a main body connection portion 3002*d*. When the electrical connection component 3002 is mounted, the electrical transmission portion 3002*c* is first passed through the first hole 1*a* located on the driving side of the housing 1, and the electrical transmission portion 3002*c* is passed through the inner space of the developer accommodating chamber 54 and then passed through the second hole 1*b* on the opposite side of the driving side. In order to better prevent the developer from leaking from the first hole 1*a* and the second hole 1*b*, a sealant sleeve 52 is provided at each of the first hole 1*a* and the second hole 1*b*. After the electrical connection component 3002 is mounted, the sealant sleeve 50 is sleeved on the outside of the electrical transmission component 3002*c*, and a gap between the electrical transmission component 3002*c* and the first hole 1*a* and a gap between the electrical transmission component 3002 and the second hole 1*b* are sealed. The housing 1 is also provided with a third hole 1*c* for fixing the auxiliary fixing portion 3002*b* of the electrical connection component 3002. Preferably, considering the economy and practicability of the product, the electrical contact portion 3002*a*, the auxiliary fixing portion 3002*b*, the electrical transmission portion 3002*c*, and the main body connection portion 3002*d* of the electrical connection component 3002 are made of an integrated metal wire, preferably a steel wire material. A bent portion is formed at the electrical contact portion 3002*a* of the electrical connection component 3002, and the bent portion is used to strengthen the local mechanical strength of the electrical connection component 3002. The electrical contact portion 3002*a* of the electrical connection component 3002 is used to come into electrical contact with the power supply component in the image forming device, and the electrical transmission portion 3002*c* is used to transmit power to other components in the developing cartridge. In this embodiment, an electrical access portion 1101*a* that comes into contact with the electrical transmission portion 3002*c* of the electrical connection component 3002 is provided on an electrical transfer component 1101 as a bearing, the electrical access portion 1101*a* is configured as a through hole. The electrical transmission portion 3002*c* is inserted into the through hole and is in interference fit with the through hole. The shape of the electrical access portion 1101*a* is configured so that the shape of the inner hole is a polygonal shape, facilitating insertion and interference of the electrical transmission portion 3002*c*. A developing roller bearing portion 1101*b* and a supply roller bearing portion 1101*c* are formed on the electrical access portion 1101*a*, the developing roller shaft 2*a* passes through the developing roller bearing portion 1101*b* and is supported by the developing roller bearing portion 1101*b*, and the supply roller shaft 6*a* passes through the supply roller bearing portion 1101*c* is supported by the supply roller bearing portion 1101*c*. In the front-rear direction, the electrical connection component 3002 is located between the developing roller 2 and the agitator 7. This design can make full use of the space between the developing roller 2 and the agitator 7, facilitating the miniaturization of the developing cartridge.

Figure 18:
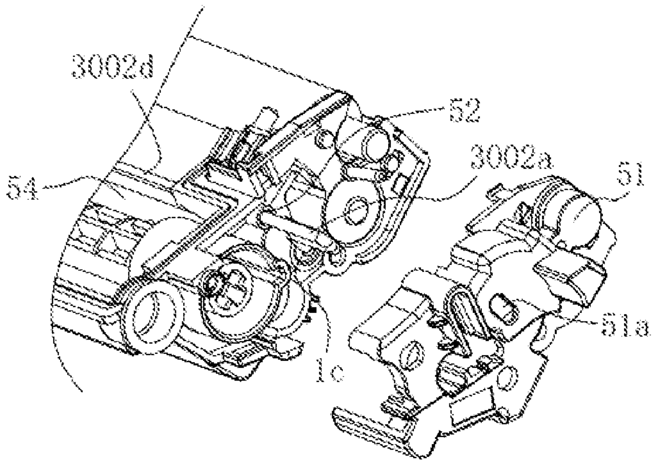
FIG. 18 is a schematic view of a partial exploded structure of a driving side of the developing cartridge in Embodiment 9 of the present invention.
Figure 19:
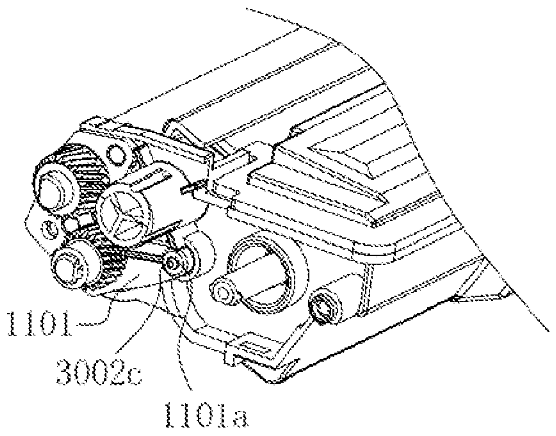
FIG. 19 is a schematic view of a partial three-dimensional structure of an opposite side of the driving side of the developing cartridge in Embodiment 9 of the present invention.

As shown in FIG. 18, an exposure opening 51*a* is provided on a protective cover 51 on the opposite side of the driving side, and the electrical contact portion 3002*a* of the electrical connection component 3002 passes through the exposure opening 51*a* and is exposed outside the developing cartridge through the exposure opening 51*a* to be in electrical contact with the power supply component in the image forming device. Meanwhile, the exposed opening 51*a* may also serve as a limiting portion to limit the movement of the electrical contact portion 3002*a* relative to the housing 1 through the contact between the electrical connecting component 3002 and the exposure opening 51*a*.

In other modified embodiments of the present invention, the agitator shaft inside the developing cartridge may also be made of metal or conductive resin material, and may also serve as an intermediate electrical contact portion connecting the electrical contact component and the developing roller shaft. Summarizing the above embodiments, as long as the first electrical contact portion of the electrode for electrically contacting the electrode with the power supply component of the image forming device and the second electrical contact portion of the electrode for electrically contacting the electrode with the developing roller shaft are disposed on opposites side of the developing cartridge in the length direction through the intermediate electrical connection portion, respectively, the technical effect of the present invention can be achieved, and the design freedom of the electrode is increased by utilizing the design of the electrode spanning both sides of the developing cartridge in the length direction.

The above embodiments are only used to illustrate the technical solutions of the present invention, but not to limit them. Although the present invention has been described in detail with reference to the foregoing embodiments, it should be understood by those of ordinary skill in the art that the technical solutions set forth in the foregoing embodiments can be modified, or some technical features thereof are equivalently replaced, and these modifications or replacements do not make the essence of the corresponding technical solutions deviate from the spirit and scope of the technical solutions of the embodiments of the present invention.

What is claimed is:

1. A developing cartridge, comprising:
- a housing;
- a developing roller rotatably supported by the housing, the developing roller being rotatable about an axis extending in a first direction, and the developing roller having a developing roller shaft;
- a supply roller rotatably supported by the housing and configured to convey developer to the developing roller, the supply roller having a supply roller shaft; and
- a driving gear disposed on a driving side of the housing in the first direction;
- wherein the developing cartridge further comprises a first electrical connection component and a third electrical connection component, the first electrical connection component is disposed on an opposite side of the driving side of the housing, the third electrical connection component is disposed on the driving side of the housing, the opposite side of the driving side and the driving side are located on opposite sides of the housing in the first direction, and in the first direction, one end of the supply roller shaft is in contact with the first electrical connection component, and the other end of the supply roller shaft is in contact with the third electrical connection component, wherein the third electrical connection component is simultaneously in contact with the supply roller shaft and the developing roller shaft.

2. The developing cartridge according to claim 1, wherein the first electrical connection component is in physical contact with the supply roller shaft, and the first electrical connection component is not in physical contact with the developing roller shaft.

3. The developing cartridge according to claim 1, wherein the third electrical connection component is a bearing component configured to support the developing roller shaft and the supply roller shaft.

4. The developing cartridge according to claim 3, wherein the bearing component rotatably supports the developing roller shaft and the supply roller shaft, and the first electrical connection component is mounted on the bearing component.

5. The developing cartridge according to claim 1, wherein the first electric connection component has a power receiving portion configured to receive external power.

6. The developing cartridge according to claim 1, wherein the third electrical connection component comprises a developing roller bearing portion supporting the developing roller shaft and a supply roller bearing portion supporting the supply roller shaft, and the developing roller shaft and the supply roller shaft respectively pass through the developing roller bearing portion and the supply roller bearing portion.

7. The developing cartridge according to claim 1, further comprising a detected component that is detectable, wherein the first electrical connection component and the detected component are both located on the opposite side of the driving side of the housing.

8. The developing cartridge according to claim 1, further comprising a developing roller gear mounted at an end of the developing roller shaft and a supply roller gear mounted at an end of the supply roller shaft on the driving side of the housing, wherein the developing roller gear and the supply roller gear are both meshed with the driving gear.

* * * * *